United States Patent [19]

Glascock, Jr. et al.

[11] 3,793,552
[45] Feb. 19, 1974

[54] HIGH TEMPERATURE PHOTOELECTRIC GAS MULTIPLICATION ULTRAVIOLET RAY SENSOR

[75] Inventors: Homer H. Glascock, Jr.; Harold F. Webster, both of Scotia, N.Y.

[73] Assignee: General Electric Company, Schenectady, N.Y.

[22] Filed: July 19, 1972

[21] Appl. No.: 273,098

Related U.S. Application Data

[63] Continuation-in-part of Ser. No. 128,255, March 26, 1971, which is a continuation-in-part of Ser. No. 828,298, May 27, 1969, abandoned.

[52] U.S. Cl.................... 313/101, 313/220, 250/372
[51] Int. Cl............................................ H01j 39/00
[58] Field of Search............. 313/94, 101, 102, 220; 250/372

[56] References Cited
UNITED STATES PATENTS
2,518,048    8/1950    Moore .............................. 313/94 X
2,791,712    5/1957    Friedman et al................ 313/101 X
3,262,002    7/1966    Kreplin ............................ 313/101 X

*Primary Examiner*—James W. Lawrence
*Assistant Examiner*—Davis L. Willis
*Attorney, Agent, or Firm*—Jerome C. Squillaro; Joseph T. Cohen; Julius J. Zaskalicky

[57] ABSTRACT

An ultraviolet ray sensor for operating at high temperature includes a gas-filled sealed unit which encloses a photocathode having a spherically-shaped metal crystalline end and a ray collecting means for gathering and focussing incident rays on the photocathode. The sealed unit is made of a ceramic body with one end open to admit ultraviolet rays, that end being sealed by an ultraviolet ray transmissive window, the envelope of this sensor being capable of operating in air without oxidation or release of gas from the inner walls up to temperatures in excess of 600° C.

10 Claims, 6 Drawing Figures

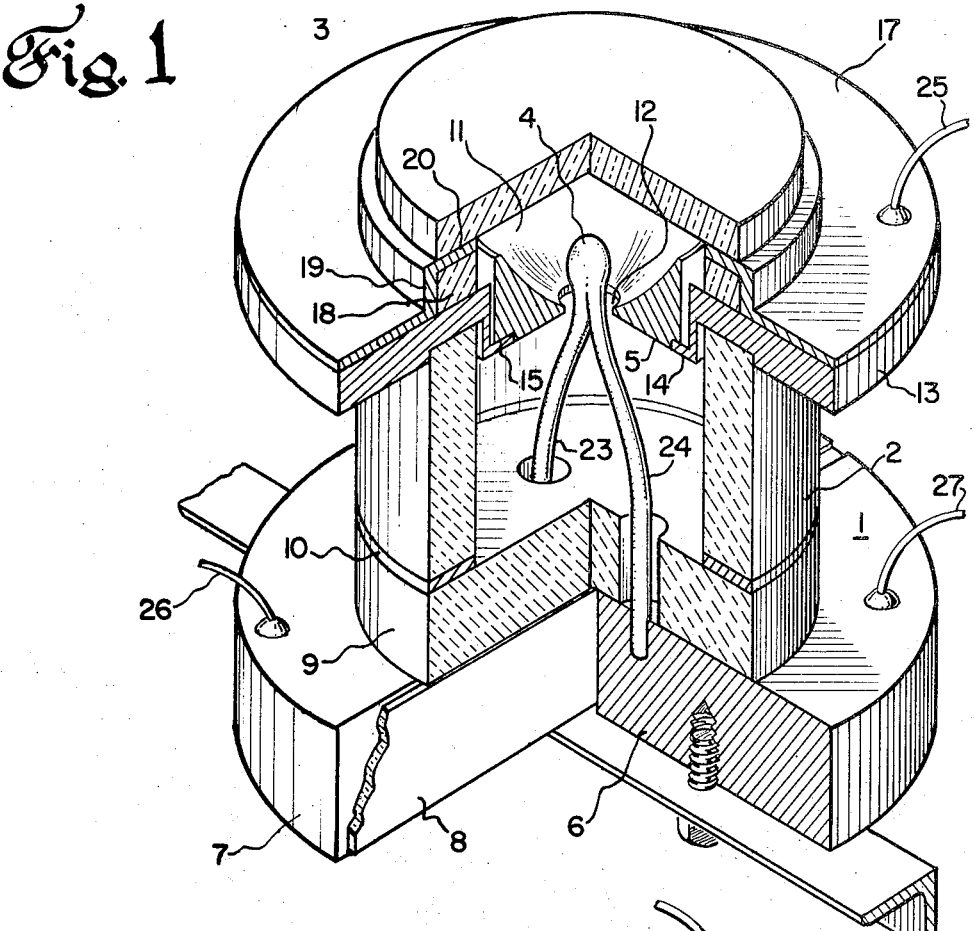
Fig. 1
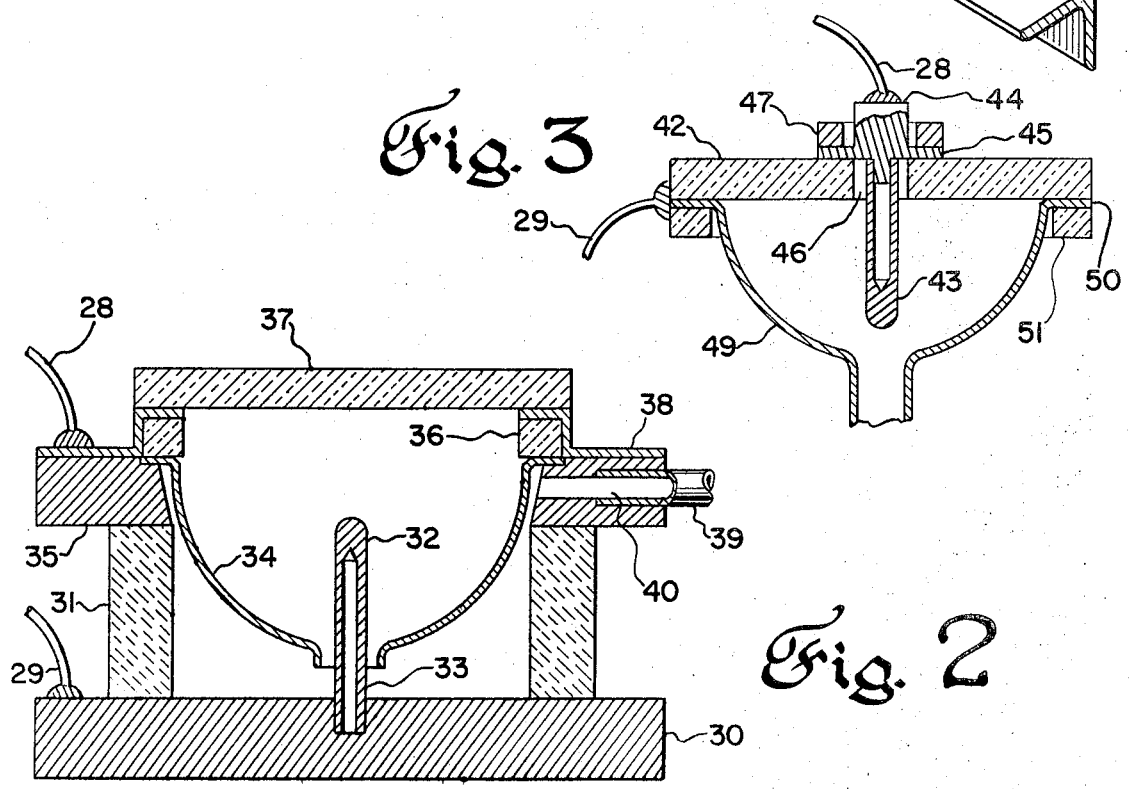
Fig. 3
Fig. 2

HIGH TEMPERATURE PHOTOELECTRIC GAS MULTIPLICATION ULTRAVIOLET RAY SENSOR

This application is a continuation-in-part of our application Ser. No. 128,255 filed Mar. 26, 1971 and now abandoned which is a continuation-in-part of our then copending, now abandoned application Ser. No. 828,298, filed May 27, 1969, both of which are assigned to the present assignee.

Our invention relates to ultraviolet ray sensors, and in particular, to such sensors which are operative over a wide range of temperatures.

The invention herein described was made in the course of or under a contract or subcontract thereunder with the Department of the Air Force.

While ultraviolet ray detectors have been used for many purposes, one use is to provide safety in aircraft where ultraviolet sensors are employed to detect flames which might occur in some portion of the plane. Such sensors typically employ a cathode which provides photoelectrons when some of the ultraviolet photons produced by the flame fall upon the cathode surface. The detectors are usually gasfilled tubes so that when a photoelectron is released by the cathode and accelerated toward an anode in the sensor, the photoelectrons give rise to pulses due to gas multiplication in the tube. It has been the practice in building such ultraviolet sensors to make the tube envelope out of transparent glass. However, on hypersonic aircraft, the temperatures to which such sensors are subjected are in excess of 500° C and glass envelopes release gas and soften at such high ambient temperatures.

Another use for an ultraviolet ray detector is as a device which will observe a flame and produce a warning signal if the flame should be extinguished. Devices of this type presently available are capable of operating only in relatively low temperature ambients and use envelopes which will not withstand the high ambient temperatures such as are encountered, for example, in a gas turbine. Furthermore, devices of this type currently available which employ a quench gas have finite life times limited by consumption of such quenching gas. Such quenching gas is consumed when an organic quenching gas is used by breakup of the gas molecules. When a halogen quenching gas is employed, the gas is consumed by reaction with the metal parts of the tube at high ambient temperatures. Other currently used devices employ a gas fill of pure hydrogen and are subject to the limitations of requiring a high operating voltage, limited temperature range, and an electrode work function which decreases with time.

It is a principal object of our invention to provide a new and improved ultraviolet ray sensor which may operate over a wide range of temperatures including those in excess of 600° C.

It is another object of our invention to provide a new and improved ultraviolet ray sensor which permits the detection of low level intensity ultraviolet rays under high ambient temperature conditions.

It is another object of our invention to provide a new and improved ultraviolet ray sensor capable of being employed either to detect the outbreak of the flame or to monitor the extinction of a flame.

In one embodiment, our invention includes a sealed gas-filled ultraviolet ray sensor which is formed from oxidation resistant materials and which includes a spherically shaped member for collecting and focussing incident ultraviolet rays upon a metal photocathode formed of a material having a work function selected in accordance with the ambient temperature and background light conditions so that it is sensitive to low level ultraviolet rays produced by the flames to be detected under such conditions. The sensor may be employed with a first type of circuit to detect low intensity ultraviolet rays such as, for example, given by the outbreak of a flame or alternatively, with appropriate circuits, to monitor an existing flame, watch for its extinction, and provide appropriate warning.

The subject matter which we regard as our invention is particularly pointed out and distinctly claimed in the concluding portion of this specification. The invention, however, both as to its orgnization and method of operation, together with further objects and advantages may best be understood by reference to the following description taken in connection with the accompanying drawings wherein like reference characters refer to like elements and in which:

FIG. 1 is a perspective view, partly in section, of an ultraviolet ray sensor embodying our invention;

FIGS. 2, 3, and 4 are vertical cross-section views of alternative embodiments of ultraviolet sensors constructed in accord with our invention;

Figure 5:
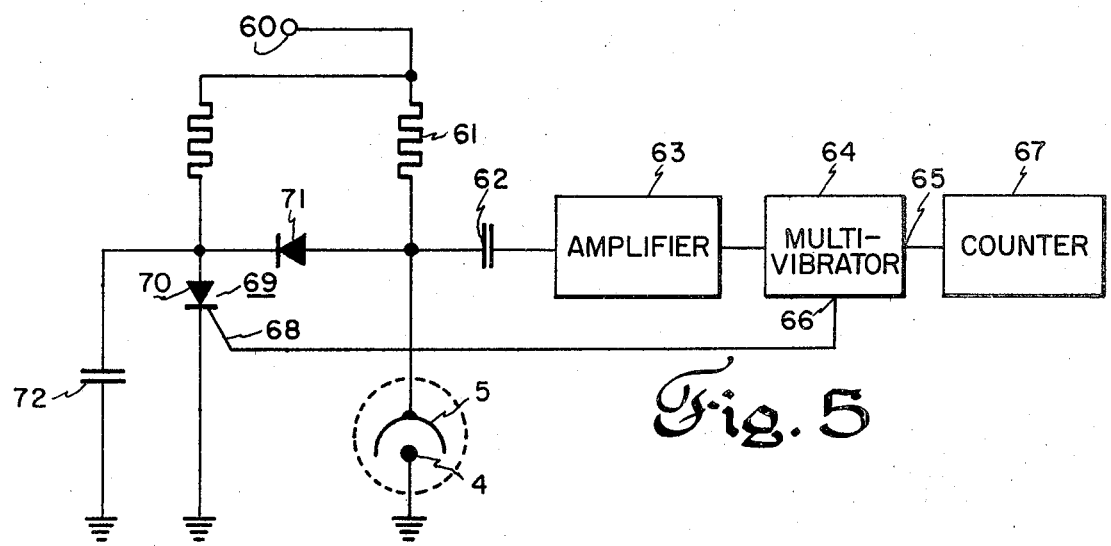
FIG. 5 is an electrical circuit employed with any of the sensors of FIGS. 1-3 to count ultraviolet photons.

The ultraviolet ray sensor illustrated in FIG. 1 comprises a base 1, a tubular ceramic body member 2, and an end window 3. The foregoing elements form a sealed unit which encloses a photocathode 4 and a light-collecting and focussing member 5, the sealed unit being filled with an inert gas such as helium, neon, argon, or mixes thereof, etc. at a suitable operating pressure of, for example, 30 – 200 torr.

In order that the ultraviolet ray sensor may operate at high temperatures, all elements of the sensor are formed of materials having high oxidation resistance. Thus for example base member 1 may be formed of two mutually electrically isolated semicircular pieces of a metal which also functions to getter or remove undesired gases from the interior of the sealed unit. Base member 1 may thus comprise two semicircular portions 6, 7 of such suitable metal, for example, titanium, the two portions being separated by a refractory dielectric material such as, for example, a forsterite ceramic having a thermal expansion coefficient matching that of titanium, such as the forsterite ceramics disclosed in U.S. Pat. No. 2,912,340, granted Nov. 10, 1959 to Alexis G. Pincus. A ceramic disk 9 rests upon and is sealed to base 1 in a wall-known manner, such as by interposing a shim (not shown) of iron or nickel. Tubular member 2 may likewise be formed of forsterite and is sealed to disk 9 by means of sealing shims 10 which may comprise, for example, a combination of iron and titanium, or nickel and titanium, shims.

Light-collecting and focussing member 5 may consist of any good ultraviolet reflecting material, preferably a metal, which is both a good anode material and also capable of sustaining its form at high temperatures and may comprise, for example, a molybdenum disk having a curved inner surface 11 and which may have a central aperture 12. Anode member 5 is supported from ceramic tubular member 2 by means of suitable anode support means which may comprise an annular member 13 having a depending central flange 14 for engaging a shoulder 15 on member 5. Annular member 15 may be formed of a metal which also functions to getter or remove unwanted gases from the sealed unit and for this purpose may be formed of titanium, for example. Base 1, tubular support 2, window 3, and anode support means 13, or their functional equivalents, together with added appendages as illustrated in the various embodiments herein, for example, are sealed together to form an hermetically sealed envelope adapted to contain the ambient atmosphere required, as for example the inert gas.

Window 3 is formed of a material which has a high temperature softening point, i.e., above 600° C, which is transmissive to ultraviolet rays, and which is compatible with the gas filling the sealed unit. Thus, for example, if argon is used as the filling gas, window 3 may consist of quartz. However, when helium is used as the filling gas, we have found that sapphire is preferable as the material for window 3 being transmissive of ultraviolet and impermeable to helium. When a sapphire window 3 is used, a special construction should be employed which permits sealing the window to the remainder of the sealed unit. In the construction shown in FIG. 1, such a sealing system comprises an annular metal member 17 formed of nickel, for example, and a ring 18 of sapphire. Annular member 17 is, in this construction, provided with a shoulder 19 which receives sapphire ring 18 and a flange 20 which is sealed to both the sapphire window 3 and sapphire ring 18 in any suitable manner such as, for example, by inserting a shim of nickel between the sapphire members 3, 18 and flange 20. Annular metal ring 17 then is in turn brazed or sealed to member 13. With this construction, ceramic body member 2 and ring 18 jointly form a cylindrical ceramic enclosure for the photocathode 4 and light-collecting and focussing anode member 5. Ultraviolet ray transparent sapphire window 3 is sealed across one end of this ceramic enclosure to admit ultraviolet rays for focussing by reflecting member 5 on the photocathode 4.

Photocathode 4 may be a spherically shaped metal crystalline body and is fabricated of an electron emitting or cathode material having a work function selected in accordance with the ambient or background lighting conditions and the maximum temperature to which the tube is exposed. Thus, if the ultraviolet sensor is to be used where the ambient light is of shorter wavelengths, a high work function material, such as platinum, is used for photocathode 4. At the other extreme, where the sensor is to be used in a relatively low level ambient or background light, a lower work function material, such as niobium or tantalum, may be employed. We have found that, for general purpose conditions, intermediate work function photocathode materials, such as molybdenum or tungsten, are satisfactory. Photocathode 4 in FIG. 1 is provided double leg supports 23, 24 electrically connected respectively to semicircular segments 6, 7. One method of fabricating photocathode 4 of FIG. 1 is to bend two rods of the selected material to the desired shape, avoiding sharp bends which might produce high field points, and cutting the tip ends of the rods to mating half-cylinder forms. After both rods are electropolished to a mirror finish to remove draw marks, scratches, and other imperfections which might be high field points in the completed tube, the polished rods are welded together at the tip with the flat sides together to form a cylinder with a narrow tapered gap down its middle. After the connected rods are mounted in a vacuum system free of organic material, the rods may be heated by electron bombardment to a temperature just short of the melting point of the material to outgas the rods and induce the growth of large grains near the tip. The tip is then raised above the melting point of the material so that a liquid drop is formed which is made spherical by surface tension forces. Thereafter the tip is cooled to provide a spherically-shaped crystalline photocathode.

We increase the sensitivity of the ultraviolet ray detector by the use of light collecting and focussing member 5 having a curved inner surface 11 of a shape capable of receiving substantially all ultraviolet rays incident on window 3 and focussing such rays on photocathode 4. The exact configuration of curved inner surface 11 is determined preferably by the shape of the volume in which the ultraviolet rays to be detected are found. Thus, if the rays to be detected emanate from a point source, a parabolic surface preferably is used. Alternatively, where a large volume of space is to be surveyed and ultraviolet rays from that space collected and focussed on the photocathode, a hemispherical configuration is desirable. The hemispherical structure permits direct light to arrive on the photocathode with a viewing angle greater than 90° and at the same time provides appreciable light concentration for viewing angles less than 60°. The on-axis light concentration depends on the ratio of the hemispherical mirror size to the photocathode size, as well as upon the reflectivity of the material of which the mirror is made.

In selecting the material for the light collecting and focussing member 5, it is desirable to choose a material which (1) maintains its shape at high temperatures, (2) is a good anode material, and (3) is a good reflecting material for ultraviolet light. While other materials provide these characteristics in varying degrees, we have found that molybdenum is particularly suitable as a material for member 5 in our ultraviolet ray sensor. As illustrated in the embodiment of FIG. 1, member 5 is provided with a central aperture through which photocathode 4 projects. This permits positioning the photocathode at the point of maximum light intensity as focussed on the cathode by the reflecting surface of member 5.

In addition to the considerations for the choice of material for the anode collector 5 mentioned above, namely, ultraviolet reflectivity, and use in an electrical discharge as an anode, the material must likewise be one which can be cleaned of surface adsorption by vacuum firing, hydrogen firing, or a combination of these processes. It is desirable to select, therefore, a material conventionally used in vacuum tubes which has a low vapor pressure at the baking temperature used during tube processing. Such materials, in addition to molybdenum, will be found in the group consisting of tungsten, rhenium, tantalum, niobium, nickel and 347 stainless steel. Of these, we have found that molybdenum has the highest ultraviolet reflectivity in the region of wavelengths encountered in detecting flames in hypersonic airplanes.

In operating the ultraviolet ray sensor, external contact for operating potentials to photocathode 4 is provided by connection to base 1, while external contact to anode 5 may be provided by connection to disks 13 and 17. Schematically such connections are shown as wires 25, 26, 27 connected to the anode and respective bases.

Figure 6:
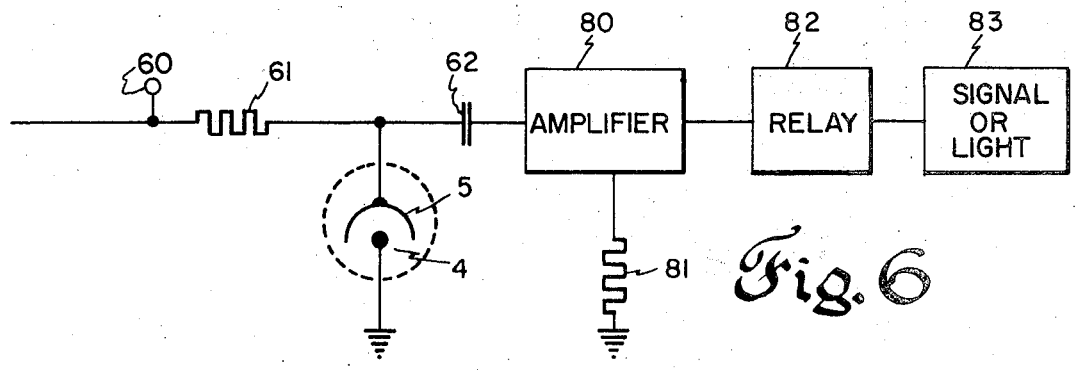
FIG. 6 is a detector or alarm circuit employed with the ultraviolet ray sensors of FIGS. 1-3 to monitor a source of ultraviolet rays and give appropriate warning of its extinction or disappearance.

Although the essence of our invention rests in provision of a crystalline photoemitter at the focus of a light collecting and ultraviolet reflecting anode member and window means juxtaposed to pass ultraviolet therethrough and upon the anode member, together with such support members as are suitable to provide an hermetically sealed envelope, the entire device being constructed of materials which are heat resistant so as to operate without error due to heat at temperatures in excess of 600° C, our invention may take many forms and be represented in many physical embodiments, so long as the functional criteria are satisfied. The device of FIG. 1 is one such embodiment. Other suitable embodiments with particular advantages are shown in the embodiments of FIGS. 2, 3, and 6 and other embodiments may readily be made.

FIG. 2 illustrates a modification of our invention which permits the fabrication of relatively inexpensive high ambient temperature gas multiplication photosensitive flame detectors. This embodiment is particularly desirable for more general applications as contrasted to the embodiment of FIG. 1 which is especially suitable for hypersonic aircraft installations. In this construction, base 30, formed of a suitable metal, such as titanium, has mounted thereon a refractory cylinder 31 of forsterite or other suitable ceramic material. A photocathode 32 is mounted in a hole 33 in base 30 and is surrounded by a light-collecting and reflecting anode 34. An annular sealing and support member 35, suitably of titanium and suitably sealed to cylinder 31, supports anode 34 and likewise provides an externally accessible terminal for the anode. The hermetically sealed envelope structure is completed by a sapphire or alumina ring 36 and a sapphire ultraviolet transmissive window 37 having interposed between them a suitable sealing flange member 38 as for example of nickel. The envelope structure is first evacuated and then filled with a suitable gas or gas mixture by means of a tubulation 39 attached to and extending into a hole 40 in support member 35.

In constructing the ultraviolet ray sensor of FIG. 2, a cylindrically symmetrical photocathode is fabricated by arc-melting the end of a chosen refractory metal rod or tube which solidifies into a substantially hemispherical shape comprising, at most, a few crystals. Alternatively a metal rod with a polished substantially hemispherical end may serve as a photocathode even though its work function is less reproducible than that of a single crystal metal hemisphere. The photocathode is placed in close-fitting bore 33 in base member 30 and constrained to the axis of the tube. After the entire stacked tube has been outgassed by vacuum heating, it is filled with a suitable pressure of a chosen gas or gas combination, such as a mixture of helium and argon. Since vacuum firing alone may not be capable of removing all of the adsorbed gases from most photocathode materials, a clean photocathode is achieved by heating the gas-filled sealed tube to a temperature at which the titanium of the envelope constituents will readily getter any active gas incident upon it. Simultaneously, the surface of the photocathode is lightly sputtered by applying suitable potentials between cathode 32 and anode 34. Alternatively, the photocathode can be heated by a focussed light beam or laser beam. In this manner, a highly clean photocathode and pure noble gas fill is obtained.

We have found that tantalum, tungsten, and molybdenum rods are suitable for constructing inexpensive, near single crystal, or poliyshed polycrystalline hemispherical photocathodes. Likewise, anode 34 may be formed inexpensively from a metal spinning of either molybdenum or nickel. Electrical contact means to this embodiment is shown schematically as by wire contacts 28 and 29 to anode support means and to base members respectively.

Another embodiment of our invention illustrated in FIG. 3 lends itself to other simplicities in manufacturing. In this modification, an end window 42 is provided with a central aperture through which projects photocathode 43. Photocathode 43 depends from a support 44, having a flange portion 45 which overlies the aperture 46 in window 42. An annular backup ring 47 is provided above flange 45 and the backup ring is sealed to the flange and the flange to the sapphire window 42 by high temperature brazing methods, as set forth herein and as well known in the art.

Light-collecting and focussing anode 49 may be formed from a relatively inexpensive spinning of a suitable metal, such as nickel or titanium, and provided with a flange 50 which is brazed between a backup ring 51 and the ultraviolet transmissive sapphire window 42. Anode 49 is provided with a tubulation 52 conveniently but not critically located along the central axis of anode 49, which permits evacuation of the tube and filling the tube with a suitable gas or gas mixture. In this embodiment, cathode 43 may be formed of a molybdenum or tungsten rod in a manner similar to that described in connection with the construction of the embodiment of FIG. 2.

In selecting the gas mixture for filling the tube, we choose a gas or mixture of gases having a desired "turn-off" or quench time and which will remain stable over a long period of use. We avoid those which are depleted by the interaction with constituents of the envelope or electrodes of the sensor, and which thereby limit the lifetime of the sensor. Thus we avoid organic quenching gases which gas molecules are dissociated and interact with the sensor structure material. Similarly, we avoid halogen-type quenching gases which react with the refractory metal portions of the sensor over a period of time at the high ambient temperatures employed. Instead, we prefer to use gases such as helium, neon, argon, xenon, or mixes thereof. Typically, when pure helium is employed, the quench time is approximately 20 milliseconds. Similarly, when a mixture of helium and argon is employed, a sensor can be constructed having a quench time of from one to five milliseconds.

Figure 4:
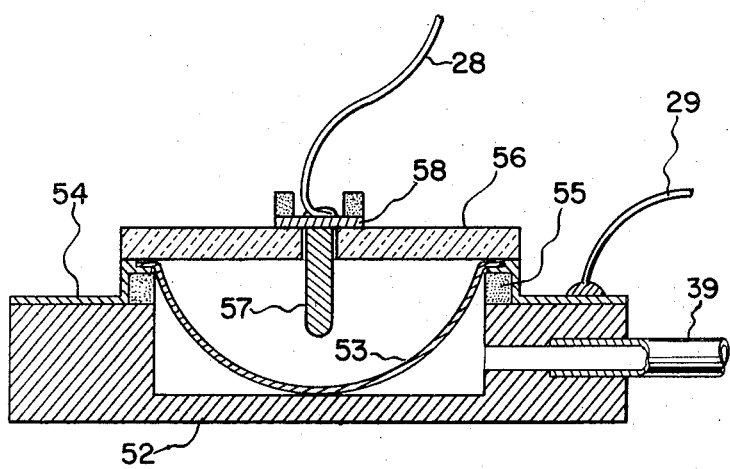

FIG. 4 illustrates in vertical schematic cross section yet another embodiment of ultraviolet sensors constructed in accord with the invention. The device of FIG. 4 like the embodiment of FIGS. 1, 2, and 3 also contains a photoemitter positioned at the focus of a concave ultraviolet reflector-anode member, an ultraviolet transmissive window for transmitting ultraviolet to be sensed to the reflector-anode and support means, all of which are resistant to the effects of high temperature and which are assembled into an hermetically sealed envelope. The device of FIG. 4 is, however, optimized from the point of ruggedness, reliability, and ease of manufacture.

In FIG. 4 base member 52, preferably an active metal such as titanium, for getting active gases has a dish-shaped configuration and supports a concave ultraviolet reflector-anode member 53 which is positioned over the lip of an annular collar 54 the flange of which rests on a strain-reducing sealing ring 55. An ultraviolet transmissive window 56 rests on the upper surfaces of collar 54 and the edge flange of reflector-anode 53 and is sealed thereto with conventional refractory-to-metal seals as described herein and well known to the art. Photoemissive cathode member 57 extends downwardly through a central aperture in window 56 and has either a remelted crystalline substantially hemispherical inwardly depending end or a machined and highly polished polycrystalline substantially hemispherical end, which is located at the focal point of the reflector of reflector-anode, be it hemispherical, parabolic or other curved surface. Photocathode 57 is suspended from a metallic support member 58 backed with a strain reducing ceramic annulus which are all effectively sealed in insulator-to-metal seal as well known in the art. The diameter of the photocathode support is small as compared with the diameter of the window so as not appreciably to reduce transmission of ultraviolet therethrough. Typically such dimension is usually less than one-fourth of that of the window, and without exception less than one-third of the window diameter.

The device, once sealed, is hermetically sealed and may be evacuated through exhaust tubulation 39 and thereafter filled with the desired gas or gases as is recited hereinbefore. Anode 53 is conveniently of a refractory metal, preferably molybdenum, photocathode 57 is preferably of molybdenum or tungsten as is set forth hereinbefore. Window 56 is of an ultraviolet transmissive ceramic or cystalline insulating material, and is preferably of sapphire, although other ultraviolet transmissive materials may be used. The sealing rings 55 are generally of the same material as the window, but may also be of alumina or other suitable ceramic.

To facilitate exhaust and refill, the ultraviolet reflector-anode has a small aperture centrally located therein, to provide gaseous communication therethrough.

This embodiment is extremely rugged in that the bottom and sides are of metal and the seals are all in the vicinity of the window. The configuration is compact and lends itself to accurate and economical fabrication. Electrical contact is made to the photocathode 57 and to base member 52 as is illustrated schematically by means of wire contacts 28 and 29 respectively.

FIG. 5 illustrates an electrical circuit employed with the sensor of our invention to detect the arising or incidence of ultraviolet rays. In this circuit, operating potentials for anode 5 are provided from a suitable source of unidirectional voltage 60 through a bias resistor 61, photocathode 4 being connected to ground. In a typical application, a small fraction of ultraviolet photons produced, for example, by a flame pass through the ultraviolet ray transparent window of the sensor are collected by the ultraviolet ray light reflecting member 5 and focussed on the hemispherically shaped photocathode 4. The focussed rays, upon falling on the photocathode, give rise to photoelectrons at the cathode surface.

When a photoelectron is released by the cathode, it is accelerated toward the light reflecting member 5, now functioning as an anode, and gives rise to ionization and gas multiplication in the gas filled sensor. At the onset of such an avalanche breakdown within the sensor, a negative voltage is generated across bias resistor 61 and coupled through capacitor 62 to the input of a voltage amplifier 63. The output of amplifier 63 is connected to a direct current set-reset or one-shot multivibrator circuit 64 having output terminals 65 and 66. Terminal 65 is connected to a counter 67. Terminal 66 supplies the signal at the output of the multivibrator circuit to control gate 68 of a silicon controlled rectifier 69, turning it to a current transmitting mode. Collector electrode 70 of rectifier 69 is coupled through a diode 71 to anode 5 and in effect short circuits the sensor. A capacitor 72 connected across SCR 69 functions rapidly to remove the bias voltage from the silicon controlled rectifier. In operation, gate 68 of silicon controlled rectifier 69 is held positive for a duration determined by the time constant of multivibrator circuit 64. Once the multivibrator resets, the gate signal is removed from silicon controlled rectifier 69. The silicon controlled rectifier decommutates and an operating potential is reapplied to anode 5 of the sensor. When the operating voltage across the sensor charges up to the potential of supply 60, diode 71 effectively disconnects the sensor from the silicon controlled rectifier circuit thus minimizing the capacitive loading of capacitor 72.

The sensor of our invention, when applied in the circuit of FIG. 5, is capable of operation at temperatures up to 1,000° F and at altitudes of approximately 20 miles. The circuit senses the start of the avalanche breakdown in the sensor, initiates removal of the bias voltage from the anode, generates an output pulse per event to an external count accumulator and reapplies the bias voltage to the anode after a fixed inhibit time determined by the reset time of multivibrator 64.

FIG. 6 illustrates a circuit in which our sensor is employed to signal the disappearance or extinction of a source of ultraviolet light, such as a flame. The circuit is particularly useful for monitoring the operation of a gas turbine, for example. In this circuit, the sensor continuously provides a signal to an amplifier 80 which produces a bias drop over a resistor 81 sufficient to maintain a relay 82 in a closed condition. When a signal is not supplied from the sensor and no current passes through amplifier 80, resistor 81 assumes ground potential causing dropout of relay 82 and energizing signal 83. Signal 83 may be of a visual type, such as a lamp, or the audible type, such as a horn or other warning device. A sensor of our invention, operating with the circuit of FIG. 6 has been used at a temperature of 540° C for more than 1,500 hours to monitor the continuous operation of a flame. It is particularly useful, therefore, for monitoring extinction of flames in such equipment as gas-powered turbines, jet aircraft and other installations where harsh environments preclude the use of less costly flame watchers.

One of the advantages of the gas multiplication ultraviolet sensor of our invention is that by combining a light-collecting and focussing electrode with a metal crystal photocathode formed of a metal having a work function correlated with the ambient light and ambient temperature in which the sensor is to be used, we enhance the sensitivity of the tube and maximize electron emission from the photocathode. In such a construction, the reflecting surface views the field to be surveyed and collects and focusses the ultraviolet rays in that field upon the photocathode, thereby maximizing current flow in the tube.

While we have shown and described several embodiments of our invention, it will be apparent to those skilled in the art that various changes and modifications may be made without departing from our invention in its broader aspects, and we, therefore, intend the appended claims to cover all such changes and modifications as fall within the true scope and spirit of our invention.

What we claim as new and desire to secure by letters Patent of the United States is:

1. An ultraviolet ray sensor for operation at high temperatures comprising a inert gas-filled hermetically sealed unit including a active gas gettering base member, a photocathode having a substantially hemispherically shaped crystalline electron emitting surface, an ultraviolet reflecting anode means encircling said photocathode for collecting incident rays and focussing them on said photocathode, said photocathode and said ultraviolet reflecting anode means being supported from said base member in juxtaposition to each other so that ultraviolet radiation incident upon said anode means is focussed upon said substantially hemispherically shaped electron emitting surface, and an ultraviolet transmissive window sealed across the face of said ultraviolet reflecting anode means to admit ultraviolet rays for focussing on said photocathode, said anode means comprising an ultraviolet reflecting member having a curved inner surface of shape effective to receive substantially all ultraviolet radiation incident on said window and focus such radiation on said photocathode, all of the constituents of said sensor comprising materials having high melting points, high resistance to oxidation, and accurately operative at temperatures in excess of 600° C.

2. The sensor of claim 1 in which said photocathode comprises a substantially-hemispherically-shaped metal crystalline body having a work function correlated with the ambient radiation to be sensed and operating temperatures of said sensor to maximize electron emission from the photocathode.

3. The sensor of claim 2 in which said photocathode comprises molybdenum.

4. The sensor of claim 2 in which said photocathode comprises tungsten.

5. The sensor of claim 2 in which said ray-collecting means has a central aperture and means for supporting said photocathode extends through said aperture to position said photocathode at approximately the focal point of the curved surface and the point of maximum ultraviolet intensity.

6. The sensor of claim 2 in which said window has a central aperture and means for supporting said photocathode extend through said aperture to position said photocathode at approximately the focal point of the curved surface and of maximum light intensity.

7. The sensor of claim 2 in which said photocathode comprises crystalline molybdenum or tungsten, said window comprises sapphire, and said base member comprises titanium.

8. The sensor of claim 6 in which a said base member comprises a dish-shaped member which supports said anode member and said window so as to locate said photocathode with the inwardly depending end thereof at the focal point of said reflecting anode surface.

9. The sensor of claim 8 in which said ray-collecting and focussing anode means comprises a substantially hemispherical molybdenum or nickel spinning.

10. The sensor of claim 1 in which said sealed unit is filled with a gas or gas mixture and said window is impermeable to said gas filling.

* * * * *